US008177914B2

(12) United States Patent
Peters

(10) Patent No.: US 8,177,914 B2
(45) Date of Patent: May 15, 2012

(54) DUAL PATH BLOWER METHOD AND APPARATUS

(76) Inventor: Clifford Peters, Clearwater, FL (US)

(*) Notice: Subject to any disclaimer, the term of this patent is extended or adjusted under 35 U.S.C. 154(b) by 0 days.

(21) Appl. No.: 11/889,933

(22) Filed: Aug. 17, 2007

(65) Prior Publication Data
US 2009/0044835 A1  Feb. 19, 2009

(51) Int. Cl.
*B08B 5/00* (2006.01)
*A47L 25/00* (2006.01)

(52) U.S. Cl. .......... 134/25.1; 15/327.5; 15/330; 15/344; 15/405

(58) Field of Classification Search ............. 15/327.2, 15/330, 344, 405, 327.5, 410; 134/24, 25.1, 134/42
See application file for complete search history.

(56) References Cited

U.S. PATENT DOCUMENTS

| 6,076,231 | A  | * | 6/2000 | Bucher ................... 15/405 |
| 6,345,956 | B1 |   | 2/2002 | Lin |
| 6,928,693 | B1 |   | 8/2005 | Ericson |
| 2002/0166195 | A1 | * | 11/2002 | Dahlberg et al. ......... 15/327.5 |
| 2003/0082016 | A1 | * | 5/2003 | Eavenson et al. ............ 406/38 |

FOREIGN PATENT DOCUMENTS
WO  WO 2006/087608 A2  8/2006
* cited by examiner

*Primary Examiner* — Michael Barr
*Assistant Examiner* — Benjamin Osterhout
(74) *Attorney, Agent, or Firm* — Sandra L. Layer

(57) ABSTRACT

An embodiment in accordance with the present invention provides a blower and a method for landscaping and lawn maintenance. The blower includes an outer housing having an inner chamber, the outer housing defining at least one discharge port and an impeller disposed within the inner chamber of the housing. The impeller has a first side surface and a second side surface, wherein a first plurality of blades are mounted to the first side surface and a second plurality of blades are mounted to the second side surface. The second plurality of blades are a mirror image of the first plurality of blades. Air or other fluid is expelled through the discharge ports and can be directed using discharge tubes in order to redistribute debris or fluid.

15 Claims, 6 Drawing Sheets

DUAL PATH BLOWER METHOD AND APPARATUS

FIELD OF THE INVENTION

The present invention relates generally to a method and apparatus for landscaping and lawn maintenance. More particularly, the present invention relates to a blower housing with multi-inlet and outlet nozzle blower.

BACKGROUND OF THE INVENTION

Portable blowers have been a useful addition to landscaping and lawn maintenance tools for both professional landscapers and individual homeowners. Many of these blowers are large hand held blowers; however, the backpack blower provides a lighter and more portable alternative. Generally, backpack blowers are limited to include a single air suction intake side along with a single discharge port and a single air discharge nozzle to direct the flow of air and move debris. The conventional blower leaves the user with one unused hand, available for other use.

In order to further increase the productivity and decrease time of a person using the backpack blower, two separate blowers can be used together. A person can wear a backpack blower while carrying an additional handheld blower and operate a nozzle from each of the blowers one in each hand. However, for a person to carry two separate blowers at the same time and to coordinate their use can become a difficult task. Carrying two blowers can be heavy and it may be difficult to operate the two separate pieces of equipment at the same time.

Accordingly, it is desirable to provide a method and an apparatus that will provide a lightweight dual port twin handed blower, in order to decrease the amount of energy and time necessary to redistribute waste or other debris.

SUMMARY OF THE INVENTION

The foregoing needs are met, to a great extent, by the present invention, wherein in one aspect an apparatus is provided that in some embodiments provides a lightweight dual port blower having a single engine, in order to decrease the amount of time and energy necessary to redistribute lawn and garden waste or other debris.

In accordance with one aspect of the present invention, a blower housing, includes an outer housing defined with dual or multiple sided suction intake ports having an inner chamber, defining at least one discharge port, and an impeller disposed within the inner chamber of the housing, having a first side surface and a second side surface, wherein a first plurality of blades extend perpendicular to the first side surface and a second plurality of blades extend perpendicular to the second side surface. The first plurality of blades can be a mirror image of the second plurality of blades, and the impeller can take the form of a disk having the first plurality of blades and the second plurality of blades positioned radially around a center point of the impeller. Multiple discharge tubes can be coupled to the at least one discharge port, and a motor can be mounted on the outer housing and coupled to the impeller.

In accordance with another aspect of the present invention, the backpack blower system can include at least a shut off and a throttle switch connected to a motor and mounted on one and or both of the two discharge tubes. Additionally, the outer housing can take the shape of a snail shell and can include two pieces. A nozzle adapter coupled or mounted on the outer housing can also be included to define multiple openings, to which the two discharge tubes can be coupled. The nozzle adapter can have a cover or flapper that can be positioned or maneuvered over one of the two openings to form a single flow path for air from the discharge port of the outer housing through one of the openings and out through one of the discharge tubes.

In accordance with another aspect of the present invention, a method of redistributing debris includes carrying a blower having two discharge tubes coupled to a single outer housing having a single mirrored impeller disposed within the outer housing, and providing a control signal. The method can also include rotating the impeller with the motor, generating a supply of air within the outer housing, and expelling the supply of air through one or both of the two discharge tubes. Additionally, the method can include directing the supply of air using the two discharge tubes, and moving the debris to a desired location using the air directed out of the discharge tubes. The debris redistributed by the blower can be lawn and garden waste.

In accordance with still another aspect of the present invention, the method can also include using a blower having a backpack support frame or a handle coupled to the outer housing. The method can include using a blower including an impeller having blades located on a first and a second surface wherein the blades are mirror images of one another. The method can also include using a nozzle adapter defining two openings to which the discharge tubes are coupled. The method can further include blocking one of the openings of the nozzle adapter and/or removing one of the two discharge tubes coupled to the nozzle adapter.

In accordance with yet another embodiment aspect of the present invention, a means for redistributing lawn and garden debris includes a means for defining an inner chamber and at least one discharge port, and a means for creating a flow of air within the inner chamber. The means for creating a flow of air includes blades located on two opposite sides of a disk.

In accordance with even another embodiment aspect of the present invention the means for redistributing lawn and garden debris includes a means for discharging the flow of air out of the inner chamber into two discharge tubes and a means for directing the discharged flow of air.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments such as larger Wheeled Street or construction Power Blowers in addition to those described and of being practiced and carried out in various ways. Also, it is to be understood that the phraseology and terminology employed herein, as well as the abstract, are for the purpose of description and should not be regarded as limiting. This embodiment can be used for other fluids or matter to include and not limited to water, mulch, insulation smoke, fumes and other sorts of matter.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
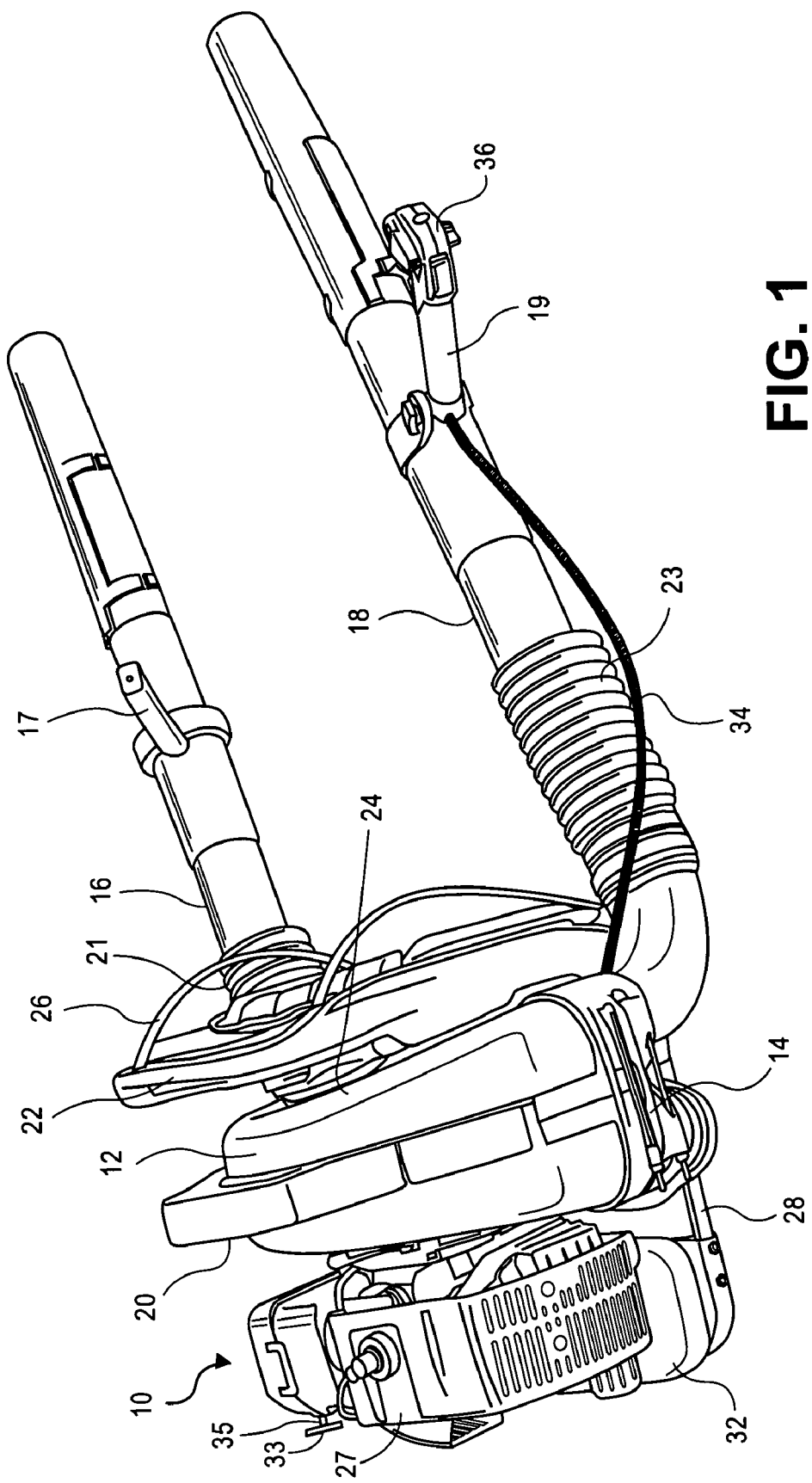
FIG. 1 is a perspective view illustrating a blower according to an embodiment of the invention.

The invention will now be described with reference to the drawing figures, in which like reference numerals refer to like parts throughout. An embodiment in accordance with the present invention provides an apparatus for redistributing lawn and garden waste or any other debris that needs to be moved to a new location for easier collection. The embodiments in accordance with the present invention may include an outer housing, a single mirrored impeller disposed within an inner chamber of the outer housing, discharge tubes to direct air flow from the blower, a motor, and a backpack support frame.

FIG. 1 is a perspective view illustrating a blower 10, according to one embodiment of the invention. FIG. 1 illustrates an outer housing 12 defining a discharge port 14. Multiple discharge ports can be defined by the outer housing 12. Two discharge tubes 16, 18 are coupled to the discharge port 14 and can be formed from a lightweight material, such as a plastic. Preferably, portions 21, 23 of the discharge tubes 16, 18 are corrugated and flexible, such that a person using the blower 10 can easily direct the discharge tubes 16, 18 one with each hand in various directions. Handles 17, 19 are mounted on the discharge tubes 16, 18, such that the tubes 16, 18 can easily be directed as desired by the operator. The outer housing 12 also can define a handle 20 so that the blower 10 can be carried by the handle 20. In order to provide hands-free transport of the blower 10, a backpack support frame 22 can be connected to a front housing intake port surface 24 of the outer housing 12. The backpack support frame 22 can be bolted onto the outer housing 12 or attached in any other manner that provides a secure connection between the blower 10 and the backpack support frame 22. The backpack support frame 22 includes at least one shoulder strap 26, so that the blower 10 can be carried on the person's back. In other embodiments of the invention, two shoulder straps 26 are provided.

Also illustrated in FIG. 1, is a motor 27 coupled to a back intake port surface of the outer housing 12. A fuel tank 32 may also be mounted on the back surface 28. A pull cord 33 is used to start the motor 27 and starter recoil 35 may also be included. A power and throttle control cable 34 extends from the motor 27 and attaches to a power and throttle switch 36 that can be mounted on either or both of the discharge tubes 16, 18. As illustrated, the power and throttle switch 36 is shown as being incorporated into one of the handles 17, 19 for ease of use. This positioning of the power and throttle switch 36 allows the user to turn the air flow on and off and regulate engine speed, without removing the blower 10 from her back. Additionally, the handles 17, 19 and the accompanying power and throttle switch 36 may be coupled on either or both discharge tubes to accommodate both hands for left and right handed users.

To use the blower 10, the user pulls the pull cord 33 to start the motor and then activate the air flow using the power and throttle switch 36. The starter recoil 35 retracts the pull cord 33 after the user pulls it. In some embodiments of the invention, an electric starter may be used rather than a pull cord 33. The motor 27 supplies power to the impeller which in turn generates a supply of air within the outer housing 12. The blower 10 can be carried by the handle 20 or worn on the back using the shoulder straps 26. If the blower 10 is worn on the back, the user can operate the discharge tubes 16, 18 using the handles 17, 19. The discharge tubes 16, 18 can be pointed in the same direction or in different directions based on the needs of the user.

Figure 2:
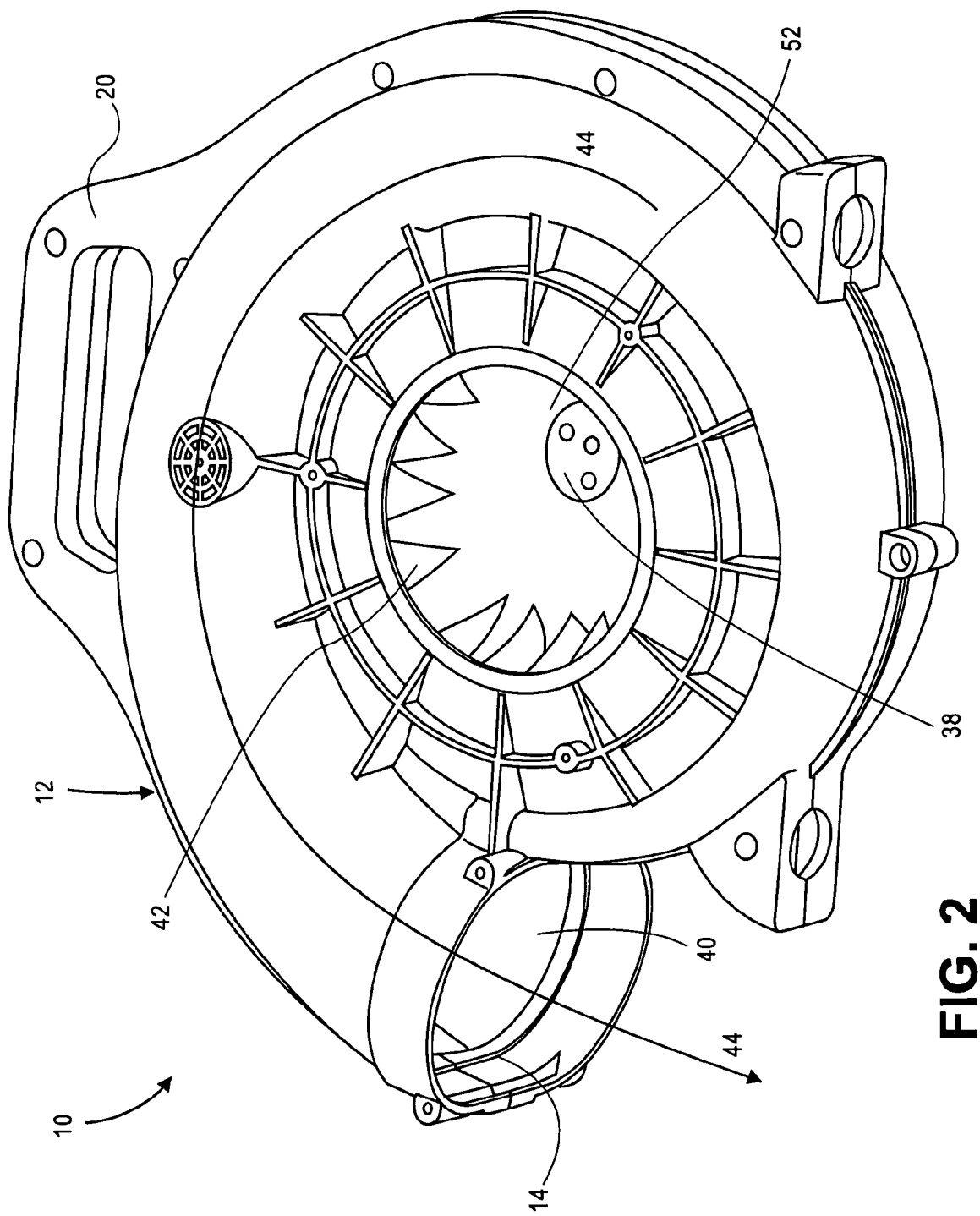
FIG. 2 is a perspective view of an outer housing of the blower in accordance with an embodiment of the invention.

FIG. 2 is a perspective view of the outer housing 12 according to an embodiment of the invention. The outer housing 12 may be formed of a plastic material or any other suitable material. The outer housing 12 defines a window 52 near the center portion of the outer housing 12 and the handle 20 near the top portion of the outer housing 12. Air is taken into the outer housing through the window 52. An impeller 38 is disposed in an inner chamber 40 of the outer housing 12. The impeller 38 includes blades 42 which create an air flow when the impeller 38 is rotated. The outer housing 12 takes a snail shell shape that directs air flow out of the discharge port 14. However, this is not meant to limit the shape of the outer housing 12, and the outer housing may take different shapes in other embodiments. The snail shell shape of the outer housing 12 defines a flow path, illustrated by arrow 44, for the air flow out of the outer housing 12 through the discharge port 14. Discharge tubes 16, 18 (shown in FIG. 1) can be coupled to the discharge port 14 to further direct the air flow in the direction desired by the user.

Figure 3:
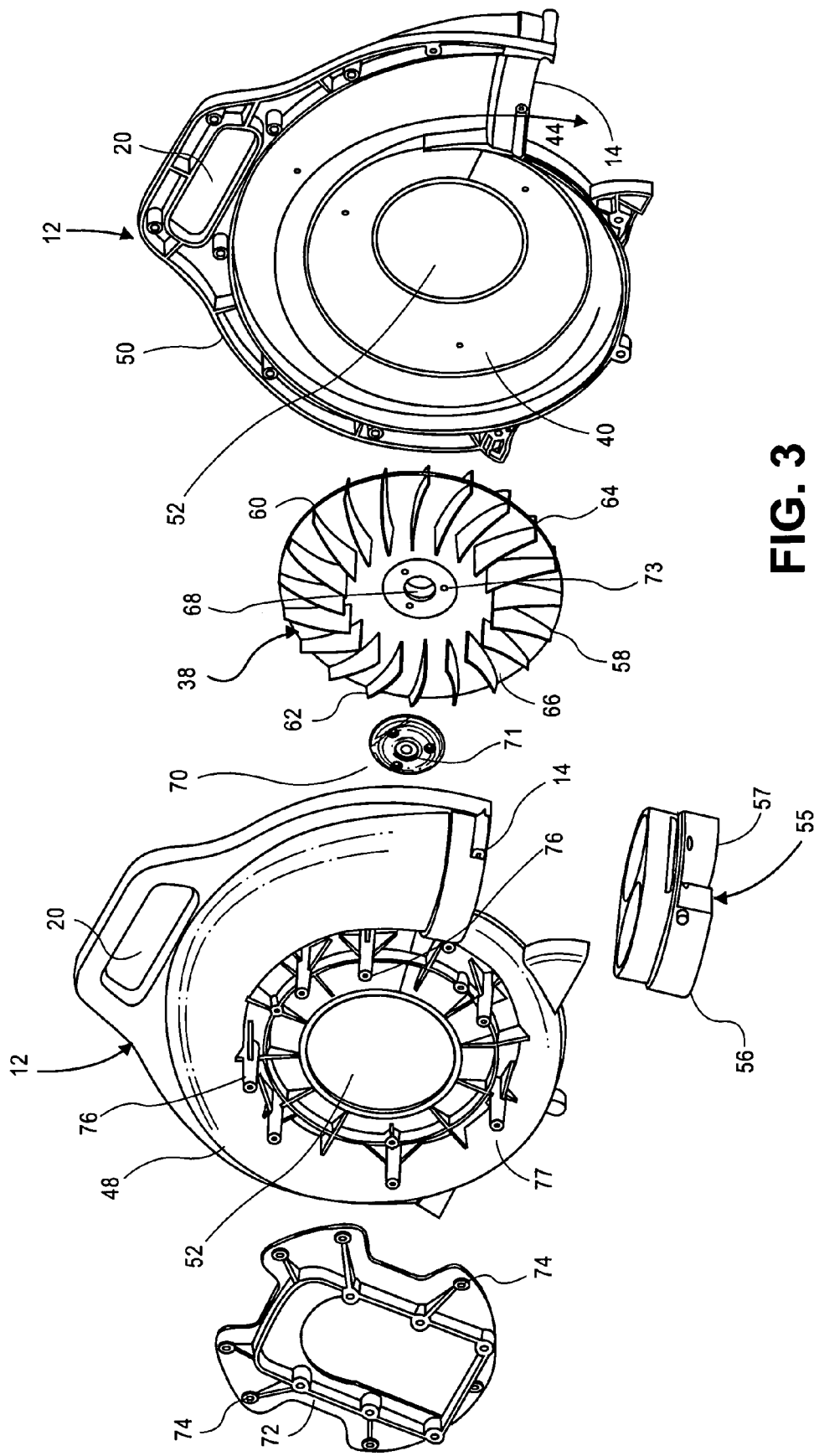
FIG. 3 is an exploded view of the blower in accordance with an embodiment of the invention.

FIG. 3 is an exploded view of the housing 12 and impeller assembly according to an embodiment of the invention. FIG. 3 illustrates the outer housing 12 having two halves 48, 50, which may be separable. In some embodiments of the invention, the housing 12 uses a clam shell design. The two halves 48, 50 form a clam shell and interlock together. In some embodiments of the invention, the two halves 48, 50 can attach to each other using fasteners such as screws or bolts or nuts. Alternately, the two halves 48, 50 can have interlocking components that fit together and hold the two halves 48, 50 together in a snap fit configuration. Air is taken into the outer housing through the window 52 in both halves of the outer housing 48, 50.

The outer housing 12 is in the shape of a snail shell and the outer housing 12 also defines an inner chamber 40. However, the outer housing 12 can take any shape that creates a flow path 44 for air to exit the outer housing 12 through the discharge port 14. Each of the two halves 48, 50 of the outer housing also can define a window 52 near a center portion of the halves 48, 50 of the outer housing 12 and the handle 20 near a top portion of the halves 48, 50 of the outer housing 12. The windows 52 are open to provide for air intake into the outer housing 12. A nozzle adaptor 55 can be coupled to the outer housing 12 to separate the discharge port 14 into two sub discharge ports 56, 57.

The impeller 38 is disposed in the inner chamber 40 of the outer housing 12, and takes the shape of a disk. The impeller 38 includes a first side surface 58 and a second side surface 60. A first plurality of blades 62 extend substantially perpendicular to the first side surface 58 and a second plurality of blades 64 extend from the second side surface 60. The first plurality of blades 62 and the second plurality of blades 64 are positioned around an outside edge 66 of the impeller 38 and radiate from a center 68 of the impeller 38. The blades 62, 64 need not extend all the way to the center 68 of the impeller, and, as illustrated in FIG. 3 can extend to a point that is approximately halfway between the outer edge 66 and the center 68. This configuration for the impeller and blades should not be considered limiting, and the impeller and blades can take any form that effectively pushes air or other fluids out through the discharge port FIG. 3 also illustrates an impeller center 70 that couples to the center 68 of the impeller 38. The impeller center 70 and the impeller 38 have corresponding openings 71, 73. These openings 71, 73 can be threaded or molded into the impeller so that the impeller center 70 and the impeller 38 are screwed or molded together. The impeller center 70 allows the impeller 38 to be coupled or screwed to the motor or drive shaft 27 that will, in turn, rotate the impeller 38 within the outer housing 12. The rotation of the impeller 38 generates a supply of air within the outer housing 12. A motor interface 72 is mounted on one of the halves 48, 50 of the outer housing 12. Openings 74 defined by the motor interface 72 fit over protrusions 76 on an outer surface 77 of the outer housing 12, in order to secure the motor interface 72 to the outer housing 12.

Figure 4:
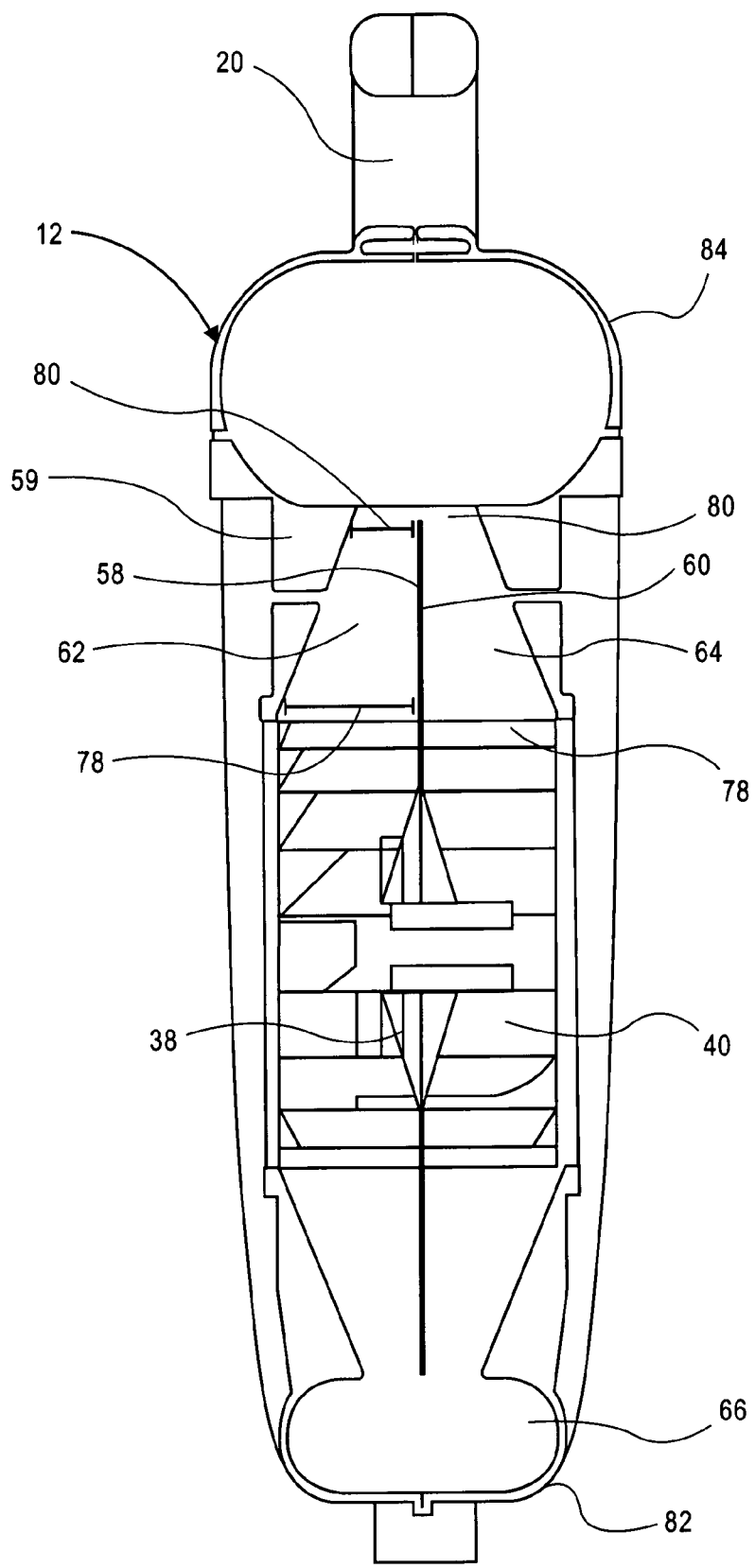
FIG. 4 is a cross sectional view of the blower in accordance with an embodiment of the invention.

FIG. 4 is a cross sectional view of the blower 10 in accordance with an embodiment of the invention. FIG. 4 illustrates the mirrored impeller 38 disposed within the inner chamber 40 of the outer housing 12. The second plurality of blades 64 is a mirror image of the first plurality of blades 62. As illustrated, each of the blades 62 is a trapezoidal shape with a first height 78 being greater than a second height 80. The first height 78 is approximately the distance between the first side surface 58 of the impeller 38 and a wall 59 of the inner chamber 40 of the outer housing 12. The inner chamber 40 near a bottom portion 82 of the outer housing 12 is also smaller in size than the inner chamber 40 near a top portion 84 of the outer housing 12. When the impeller 38 is connected to the motor 27 and the motor 27 is turned on, the impeller 38 will rotate within the inner chamber 40 to create a flow of air. The snail shell shape of the outer housing 12 then provides a flow path to direct the air out through the discharge port 14.

Figure 5:
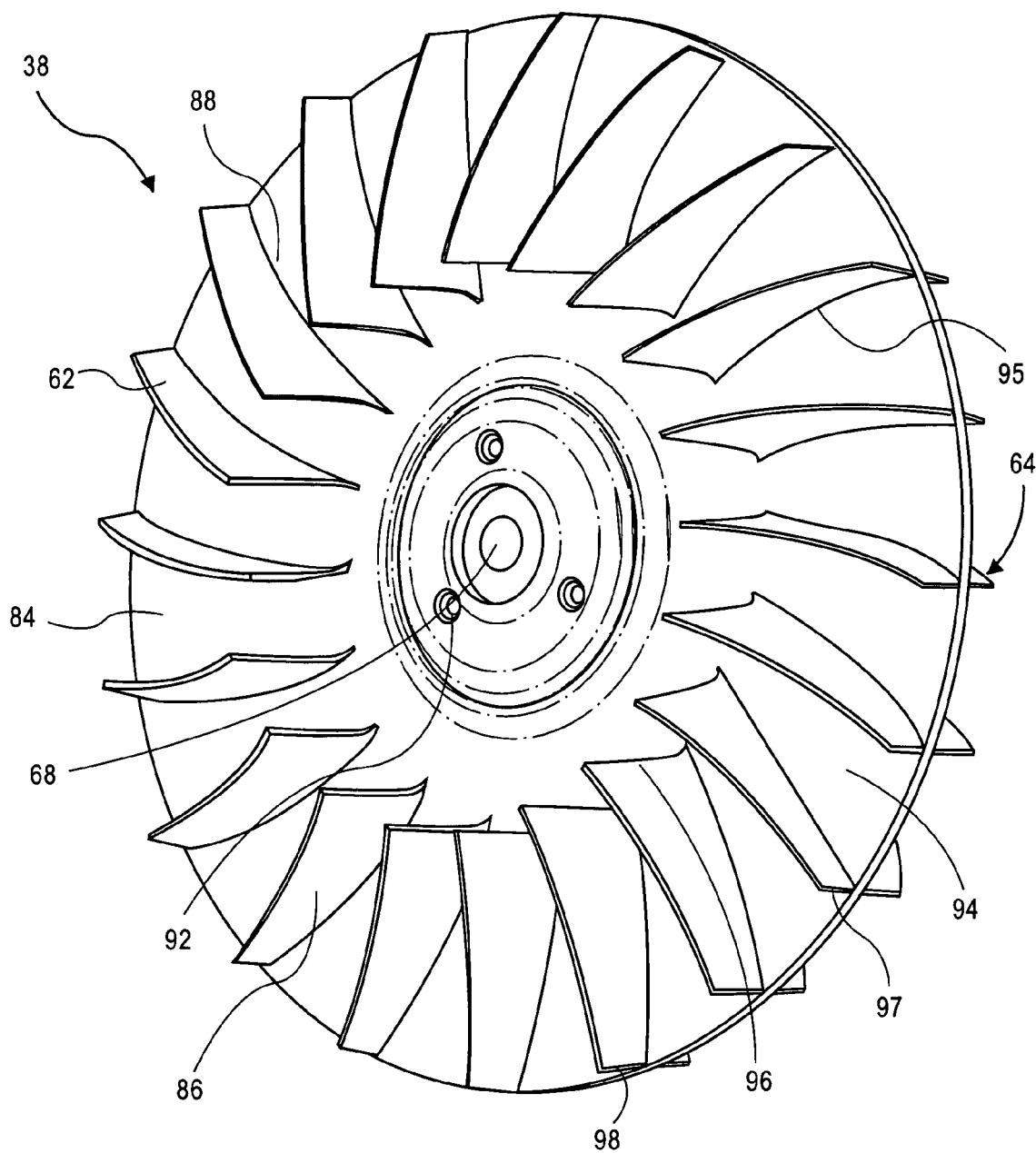
FIG. 5 is a perspective view of an impeller mirrored in accordance with an embodiment of the invention.

FIG. 5 is a perspective view of a mirrored impeller 38 in accordance with an embodiment of the invention. FIG. 5 illustrates a flat disk 84 having the first plurality of blades 62 and the second plurality of blades 64 extending perpendicular to a surface 88 of the flat disk 84. The blades in each of the plurality of blades 62, 64 are distributed radially from a center point 68 of the flat disk. Each of the blades in the plurality of blades 62, 64 has a slight curve 95 between an inner edge 96 and an outer edge 97. The curve 95 of the blade directs the air moving inside the outer housing 12. The height of each of the blades increases from the inner edge 96 of the blade to the outer edge 97 of the blade, as the blade extends from the outer edge 92 to the center 90 of the disk 84. The first height 78 of the blade measured at the inner edge 96 is greater than the second height 80 measured at the outer edge 97 of the blade. Each of the blades 86 also can have a taper 94 on the inner edge 96 of the blade closest to the center point 68 of the disk 84. The impeller 38 and the blades 86 however can take any form that effectively generates an air or other fluid flow from the inner chamber 40 of the outer housing 12 out through the discharge port 14.

Figure 6:
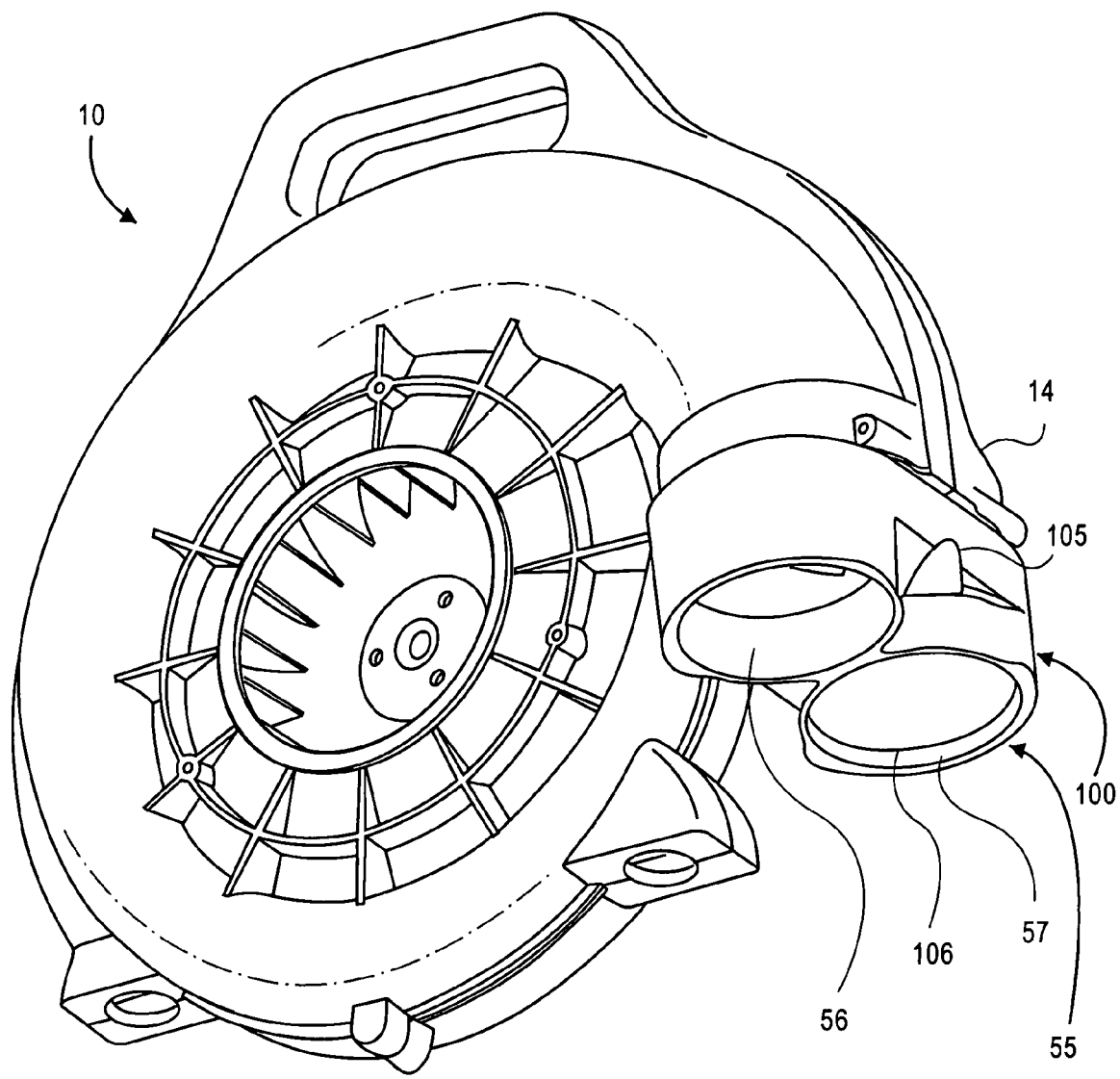
FIG. 6 is a perspective view of a blower having a nozzle adapter in accordance with an embodiment of the invention.

FIG. 6 is a perspective view of a nozzle adapter 100 in accordance with an embodiment of the invention. The nozzle adapter 100 fits into the discharge port 14 and separates the discharge port 14 into two ports 56, 57. The nozzle adapter 100 can be further secured by screws, a pin or any other means capable of providing a secure fit. The two ports 56, 57 can then be coupled to discharge tubes 16, in order to more accurately direct air flow out of the blower 10. The nozzle adapter 100 also includes a cover or flapper 106 for diverting air out of just one of the two ports 56, 57. The cover 106 can fit frictionally within one of the two ports 56, 57 or in other embodiments the user may flip a lever 105, either before or after the blower 10 is in use, which extends the cover 106 over one of the two ports. If one of the two ports 56, 57 is obstructed, the discharge tube 16, 18 not in use can be stowed until it is needed again.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A blower, comprising:
    an outer housing having an outer wall defining an inner chamber, the outer housing having an outer circumference defining an uninterrupted fluid flow path, the fluid flow path having an end positioned on one side of the outer housing and the outer housing defining a single discharge port positioned at the end of the fluid flow path, the outer housing formed in the shape of a snail shell and having at least one inlet port;
    an impeller disposed within the inner chamber of the housing, the impeller having a first side surface and a second side surface, wherein a first plurality of blades are mounted to the first side surface and a second plurality of blades are mounted to the second side surface;
    a nozzle adapter mounted to the single discharge port, the nozzle adapter being formed with two output openings; and
    a motor mounted on the outer housing and coupled to the impeller.

2. The blower of claim 1, wherein the outer housing comprises two pieces at least one having its own inlet port.

3. The blower of claim 1, wherein the nozzle adaptor comprises a cover positionable over one of the two output openings of the adaptor to form a singular flow path from the discharge port of the outer housing through one of the output openings.

4. The blower of claim 1, wherein a backpack support frame is mounted to the outer housing.

5. A method of redistributing debris, comprising:
    Providing a blower, comprising an outer housing having an outer wall defining an inner chamber, the outer housing having an outer circumference defining an uninterrupted fluid flow path, the flow path having an end positioned on one side of the outer housing and the outer housing defining a single discharge port positioned at the end of the fluid flow path, the outer housing formed in the shape of a snail shell and having at least one inlet port; an impeller disposed within the inner chamber of the housing, the impeller having a first side surface and a second side surface, wherein a first plurality of blades are mounted to the first side surface an a second plurality of blades are mounted to the second side surface; a nozzle adapter mounted to the single discharge port, the nozzle adapter being formed with two output openings; two discharge tubes, one discharge tube coupled to each of the two output openings; a motor mounted on the outer housing and coupled to the impeller;

providing power to the motor;

rotating the impeller with the motor;

generating a supply of air within the outer housing;

expelling the supply of air expelled from the outer housing; and moving the debris to a desired location using the air directed out of the discharge tubes.

6. The blower of claim 1 wherein a height and width of the fluid flow path increase from a beginning of the fluid flow path to the end of the fluid flow path.

7. The blower of claim 1 wherein the two output openings of the nozzle adapter discharge similar amounts of pressurized air.

8. The blower of claim 1, further comprising two discharge tubes, each coupled to one of the two output openings of the nozzle adapter.

9. The blower of claim 8, wherein each discharge tube is independently directable with respect to the other discharge tube and the nozzle adapter.

10. The blower of claim 8, wherein a shut off switch is connected to the motor and mounted on at least one of the two discharge tubes.

11. The blower of claim 1, wherein the impeller comprises a disk having the first plurality of blades and the second plurality of blades positioned radially around a center point of the impeller.

12. The blower of claim 1 wherein the impeller is centered in the inner chamber.

13. The method of claim 5 wherein the nozzle adaptor comprises a cover positionable over one of the two output openings of the adaptor to form a singular flow path from the discharge port of the outer housing through one of the output openings and out through at least one of the two discharge tubes.

14. The method of claim 5 wherein a backpack frame is mounted to the outer housing.

15. The method of claim 5 wherein a shutoff switch is connected to the motor and mounted on at least one of the two discharge tubes.

* * * * *